June 30, 1970 A. LUNGO 3,518,470

FILTER ASSEMBLY

Filed Jan. 13, 1969

INVENTOR.
ANTONIO LUNGO

BY

Elven J. Hyde
ATTORNEY

3,518,470
FILTER ASSEMBLY

Antonio Lungo, Middleburg Heights, Ohio, assignor to Clevite Corporation, a corporation of Ohio
Filed Jan. 13, 1969, Ser. No. 790,557
Int. Cl. H01v 7/00
U.S. Cl. 310—8.2 4 Claims

ABSTRACT OF THE DISCLOSURE

There is disclosed a novel mounting and supporting means for a piezoelectric ceramic resonator within an hermetically-sealed filter assembly, said supporting means comprise conductor pins secured to the resonator's electrode at one end and embedded in an insulating elastic, rubber-like structure at the other end, thereby minimizing spurious resonances and variation in insertion loss and bandwidth.

The present invention relates generally to a filter assembly utilizing a piezoelectric ceramic resonator, and, more particularly, to improved means for mounting and support of said resonator.

Filter assemblies utilizing piezoelectric ceramic resonators have enjoyed a considerable commercial success albeit certain problems and difficulties. One particular problem has been the mounting and supporting of the resonator within the filter assembly. Heretofore, mounting and supporting means for ceramic piezoelectric resonators have been of the compliant spring wire type which, in certain applications, can degrade filter performance by giving rise to uncontrollable variations of insertion loss and bandwidth, in addition to spurious responses and resonances. The reason for these shortcomings can be attributed to the changes of the mechanical loading of the spring wire supports with changes of the resonator's frequency.

For example, in the case of a split-ring resonator the spring wire mount presents considerable difficulties which largely stem from the fact that the nodal points on the resonator shift with any change in frequency. This shift of nodal points causes the mechanical loading of the spring wire support to change as the frequency of the resonator is increased, resulting in uncontrollable insertion loss, spurious responses and bandwidth.

It is a principal object of the present invention to provide an improved filter assembly utilizing a piezoelectric ceramic resonator which is so mounted as to substantially minimize spurious responses and microphonic vibrations, variations in insertion loss and bandwidth.

Another object of the invention is to provide a low cost filter assembly and mounting means therefor.

A further object of the invention is to provide a filter assembly which is operable over a wide temperature range.

Other objects and advantages of the invention will become more apparent from the following description taken in conjunction with the accompanying drawings wherein.

Figure 1:
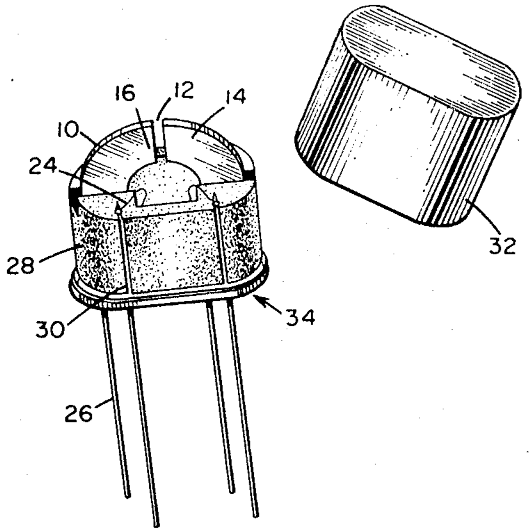
FIG. 1 is a perspective view of the filter assembly embodying the invention with the cover removed.
Figure 2:
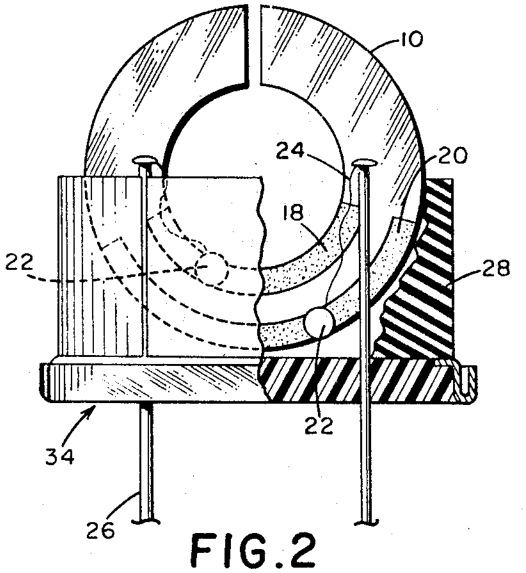
FIG. 2 is a front view of the filter assembly showing the supporting features with more details.

Referring now to FIGS. 1 and 2 of the drawings there is shown a thin flat ring-shaped piezoelectric element identified generally by the reference numeral 10. The element 10 is cut or split to define a slot 12 between adjacent end portions 14 and 16 and is formed from piezoelectric ceramic material, suitable compositions of which will be described hereinafter.

As shown in FIG. 2 the element 10 is provided with a predetermined electrode configuration on opposite surfaces of element 10 and outer arcuate electrode segments inner arcuate electrode segments 18 on opposite face surfaces of element 10 and outer arcuate eletcrode segments 20 on said surfaces. These electrode segments may comprise fired on silver material or may be formed by other suitable electroding means.

Support conductor pins 22 are soldered on the electrode segments 18 and 20 very near the nodal points of the element 10. To facilitate electrical connection conductor wires 24 are connected to support conductor pins 22 at one end and to leads 26 at the other end.

Figure 3:
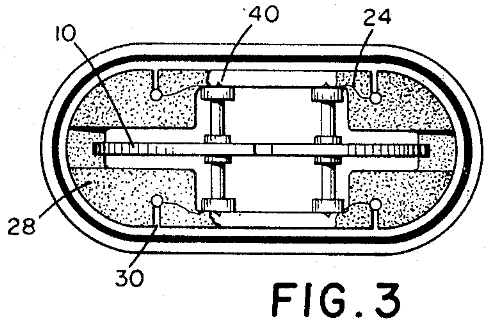
FIG. 3 is a top view showing the relative positions of the various parts of the filter assembly.

Support conductor pins 22 extend away from element 10 and into insulating support 28, as shown in FIG. 3, thus, holding element 10 in place to prevent contact thereof. Support 28 is a pad made of a soft rubber-like material whose elastic properties are not affected by changes in temperature. Slicone rubber (GE, RTV–60) has been shown to have such properties and, therefore, support 28 is preferably made of this material. Support 28, which provides mechanical isolation from the header 34 and the metal cover 32, is molded so that it has slits 30 containing portions of leads 26. Support 28 operates as a cushioning means absorbing mechanical shocks and vibrations in addition to supporting means for conductor pins 22 so that element 10 is held free from contact.

Wire conductors 24 are attached as by welding to support conductor pins 22 close to the point of contact with the silicone rubber support 28 and is connected to electric leads 26 posted on the header 34. This arrangement minimizes the effect of the wire conductor 24 to generate spurious responses.

Dimensions of support 28 correspond to the inner dimensions of a metal cover 32 which is adapted to be slidably fitted over the assembly shown in FIG. 1. Cover 32 and base or header 34 form an hermetically sealed enclosure. Header 34 is usually made of insulating material such as glass.

Figure 4:
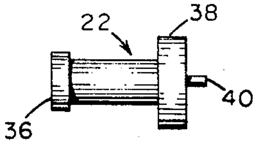
FIG. 4 is a side view of the support conductor pin.

Support conductor pin 22 is shown in FIG. 4 wherein head 36 is soldered to the electrode segment of element 10 and head 38 rests next to support 28 while section 40 is embedded into silicone rubber support 28 to suppress the mechanical vibration of the pin 22. Head 38 has a larger diameter than head 36 to provide better support and cushioning.

Referring to FIGS. 2 and 3, the support conductor pins 22 are mounted on electrode segments 18 and 20 near the nodal points of the resonator element 10. The mounting locations should be so positioned to provide structural rigidity which place some restriction on these locations. The two nodal points of split-ring resonator elements swing through an arc located between the two electrodes 18 and 20 as viewed on one side of the resonator as the frequency of the resonator element 10 is shifted. The center of the arc and the center of the resonator are concentric so that the mounting locations on the resonator are formed by the intersection of the electrode with a line through the center of the resonator and the nodal point. Four locations are formed in this manner on each side of the resonator. Only two of these locations, one to each electrode segment, are required on each side for mounting and electrical contact. It is necessary that the two mounting locations on the one side of the resonator element are not placed on the same line extending through the resonator's center and one of the nodal points. The mounting locations on both sides are to be placed so that they are opposite to each other.

The supporting structure thus described for the resonator element 10 provides a durable and rigid supporting means which, while permitting substantially free vibration of the resinator, insures excellent performance of the filter assembly by substantially minimizing spurious resonances and microphonic vibrations in addition to stabilizing insertion loss and bandwidth variations as shown in the following table where Column A gives the temperature in centigrade, Column B gives the insertion loss of a ceramic split-ring resonator supported by compliant spring wire, and Column C gives insertion loss of the same type resonator but utilizing the supporting features of the invention. The bandwidth at 20° C. for the resonators are 129 Hz. for Column B and 95 Hz. for Column C.

| A | B | C |
|---|---|---|
| Temp. in ° C | Insertion loss in DB (wire-support) | Insertion loss in DB (rubber-like-pin support |
| −45 | 0.8 | 2.8 |
| −40 | 0.9 | 2.7 |
| −10 | 1.1 | 2.3 |
| +20 | 1.4 | 2.2 |
| +40 | 1.7 | 2.4 |
| +60 | 2.0 | 2.4 |
| +85 | 2.5 | 2.7 |

It should be appreciated that Column B shows insertion loss variations ranging from 0.8 to 2.5 db or a difference of 1.7 decibels, while Column C illustrates more stability with a maximum difference of 0.5 decibel. This stabilizing effect over a wide temperature range is extremely desirable in filter operations.

Resonator element 10 is preferably fabricated from piezoelectric ceramic compositions comprising lead zirconate-lead titanate as disclosed in U.S. Pats. 3,006,857 and 3,179,594 assigned to the same assignee as the present invention. It will be apparent to those skilled in the art, however, that other ceramic compositions are suitable and that compositions disclosed in the above-mentioned patents are only given for exemplary purposes.

It is to be understood that the present invention is not limited to the precise constructions as herein described and illustrated but embraces all such variations and modifications without departing from the spirit and scope of the invention as set forth in the following claims.

What is claimed is:

1. In a filter assembly having an insulating header and a cover to define an hermetically-sealed casing, a piezoelectric ceramic resonator having electrode means on opposite face surfaces thereof, electrical leads extending through said header, and supporting means for said resonator, comprising in combination a plurality of support conductor pins firmly attached to said electrode means, a like plurality of conductor wires connecting said support conductor pins to said electrical leads, and an insulating elastic body held in said casing by the insulating header, said elastic body mounting said support conductor pins thereby to mount said piezoelectric ceramic resonator.

2. Supporting means for a piezoelectric ceramic resonator as described in claim 1 wherein said elastic body is made of silicone rubber.

3. Supporting means for a piezoelectric resonator as described in claim 1 wherein said support conductor pins are soldered on said electrode means.

4. Supporting means for a piezoelectric resonator as described in claim 1 wherein said support conductor pins have two heads of differing diameter, the smaller head being soldered to the electrode means of the ceramic resonator and the larger head terminating with a projection embedded in said elastic body.

References Cited

UNITED STATES PATENTS

| | | | |
|---|---|---|---|
| 2,546,321 | 3/1951 | Ruggles | 310—8.9 X |
| 2,705,760 | 4/1955 | Minnich | 310—8.9 X |
| 3,403,358 | 9/1968 | Kolm | 333—72 |
| 3,423,700 | 1/1969 | Curran et al. | 333—72 |

MILTON O. HIRSHFIELD, Primary Examiner

M. O. BUDD, Assistant Examiner

U.S. Cl. X.R.

310—8.9, 9.1, 9.7; 333—72